(12) United States Patent
Tan et al.

(10) Patent No.: US 12,216,451 B2
(45) Date of Patent: Feb. 4, 2025

(54) ROBOT SYSTEM

(71) Applicants: KAWASAKI JUKOGYO KABUSHIKI KAISHA, Kobe (JP); Kawasaki Robotics (USA), INC., Wixom, MI (US)

(72) Inventors: Haruhiko Tan, Kobe (JP); Masahiko Sumitomo, Kobe (JP); Junichi Sugahara, Kobe (JP); Nobuyasu Shimomura, San Jose, CA (US); Avish Ashok Bharwani, Santa Clara, CA (US)

(73) Assignees: KAWASAKI JUKOGYO KABUSHIKI KAISHA, Kobe (JP); KAWASAKI ROBOTICS (USA), INC, Wixom, MI (US)

( * ) Notice: Subject to any disclaimer, the term of this patent is extended or adjusted under 35 U.S.C. 154(b) by 323 days.

(21) Appl. No.: 17/852,443

(22) Filed: Jun. 29, 2022

(65) Prior Publication Data
US 2024/0004368 A1  Jan. 4, 2024

(51) Int. Cl.
G05B 19/41 (2006.01)
B25J 9/16 (2006.01)
B25J 21/00 (2006.01)
G05B 19/4155 (2006.01)

(52) U.S. Cl.
CPC ......... G05B 19/4155 (2013.01); B25J 9/163 (2013.01); B25J 21/005 (2013.01); G05B 2219/50391 (2013.01)

(58) Field of Classification Search
CPC ...... G05B 19/4155; G05B 2219/50391; G05B 2219/45031; B25J 9/163; B25J 21/005; B25J 9/1674; B25J 19/0066; B25J 19/06
See application file for complete search history.

(56) References Cited

U.S. PATENT DOCUMENTS

| 2009/0128080 A1* | 5/2009 | Cheng | G05B 19/0423 318/625 |
|---|---|---|---|
| 2019/0193266 A1* | 6/2019 | Ishii | B25J 9/1664 |
| 2020/0173814 A1* | 6/2020 | Kinugasa | B25J 19/06 |
| 2020/0338721 A1 | 10/2020 | Okumura et al. | |
| 2022/0410389 A1* | 12/2022 | Nagata | B25J 9/1602 |

FOREIGN PATENT DOCUMENTS

| CN | 102969975 A | 3/2013 |
|---|---|---|
| CN | 112672853 A | 4/2021 |
| JP | 2005-515451 A | 5/2005 |
| JP | 2017-513565 A | 6/2017 |
| JP | 2020-179486 A | 11/2020 |
| WO | 03/061453 A2 | 7/2003 |
| WO | 2015/148134 A2 | 10/2015 |

* cited by examiner

Primary Examiner — Kira Nguyen
(74) Attorney, Agent, or Firm — METROLEX IP LAW GROUP, PLLC; Robert L. Scott, Esq.

(57) ABSTRACT

A robot system includes a robot that includes a motor, a first storage unit that is provided to correspond to the motor and stores identification information of the motor, a second storage unit that is provided separately from the first storage unit and stores the identification information of the motor, and a control unit that detects whether or not the motor attached to the robot is a motor to which the identification information has been assigned in advance, by comparing the identification information of the motor stored in the first storage unit and the identification information of the motor stored in the second storage unit.

20 Claims, 8 Drawing Sheets

FIG. 6

```
▷pcex program a
▷
 Input password = xxxxxxx
▷
 Input number (0:Disable 1:Enable)[now:0] = 1
▷Function is Enable
```

FIG. 7

```
▷pcex program b
 Input password = xxxxxxx
 Input Robot Number = 1
 Input  Joint 1 motor serial number = 0001
 Input  Joint 2 motor serial number = 0002
 Input  Joint 3 motor serial number = 0003
              •
              •
              •
▷Motor serial numbers have been successfully written.
```

FIG. 8

```
▷pcex program c
 Input password = xxxxxxx
 Input Robot Number = 1
▷Writing to board has completed.
```

FIG. 9

```
>pcex program d

Input password = xxxxxxxx
[Function]
Enable
[Motor Information]
Robot 1
Joint1:0001
Joint2:0002
Joint3:0003
    •
    •
    •
Robot 2
    •
    •
    •

[Board Information]
Robot 1
Joint1:0001
Joint2:0002
Joint3:0003
    •
    •
    •
Robot 2
    •
    •
    •
```

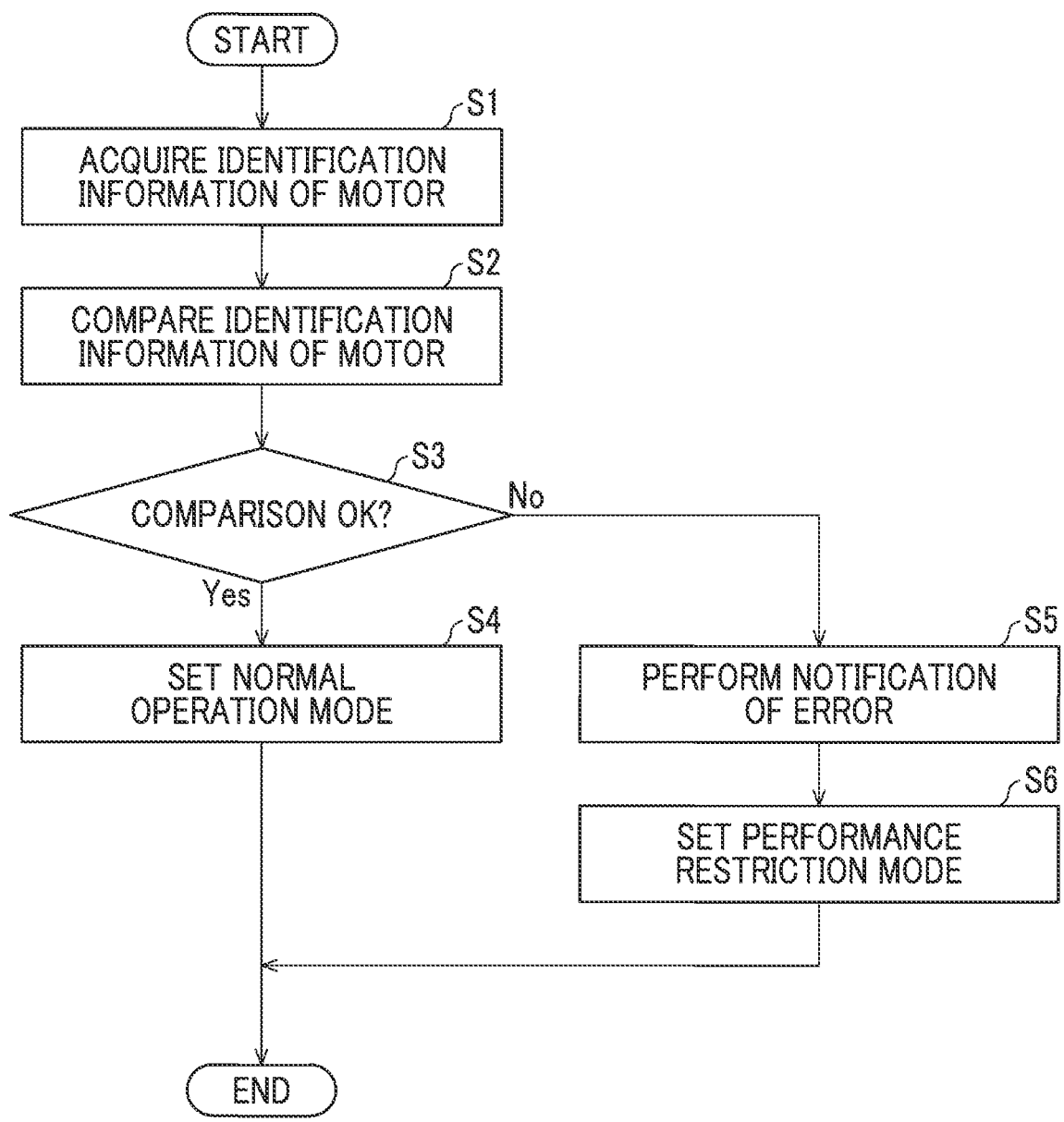

ROBOT SYSTEM

BACKGROUND OF THE INVENTION

Field of the Invention

The present disclosure relates to a robot system.

Background Art

Conventionally, a robot system including a robot is known. Such a robot system is disclosed, for example, in JP-A-2020-179486.

JP-A-2020-179486 discloses a robot system that includes a robot body and a robot controller that controls the robot body. The robot body includes a plurality of drive shafts. A motor that drives the drive shaft and an encoder that detects the rotational position of a rotation shaft of the motor are provided at each drive shaft. The encoder is provided with a storage unit that stores the serial number of the robot body. When the power is turned on, the robot controller determines whether or not the serial numbers read from the storage units of the respective encoders are the same as each other. If the serial numbers are not the same as each other, the motor has been replaced. Therefore, when the serial numbers are not the same as each other, the robot controller generates a motor replacement error.

Here, although not clearly disclosed in JP-A-2020-179486, in a production site using robots, when a failure or the like of a motor occurs, the motor may be unauthorizedly replaced without notice by a person other than an authorized engineer. In addition, there is a possibility that a robot using a motor that has been unauthorizedly replaced may malfunction, so there is a demand to detect that the motor has been unauthorizedly replaced. However, the robot system disclosed in JP-A-2020-179486 has a configuration in which, when the serial numbers read from the storage units of the respective encoders are not the same as each other, the motor replacement error occurs. Thus, in both a case where the motor is authorizedly replaced and a case where the motor is unauthorizedly replaced, the motor replacement error occurs. Therefore, when the motor is unauthorizedly replaced due to a failure or the like of the motor, there is a problem that it is not possible to easily detect that the motor has been unauthorizedly replaced.

SUMMARY OF THE INVENTION

The present disclosure has been made to solve the problems described above, and is to provide a robot system capable of easily detecting that a motor has been unauthorizedly replaced.

According to an aspect of the present disclosure, a robot system includes a robot that includes a motor, a first storage unit that is provided to correspond to the motor and stores identification information of the motor, a second storage unit that is provided separately from the first storage unit and stores the identification information of the motor, and a control unit that detects whether or not the motor attached to the robot is a motor to which the identification information has been assigned in advance, by comparing the identification information of the motor stored in the first storage unit and the identification information of the motor stored in the second storage unit.

As described above, the robot system according to the aspect of the present disclosure is provided with the control unit that detects whether or not the motor attached to the robot is a motor to which the identification information has been assigned in advance, by comparing the identification information of the motor stored in the first storage unit and the identification information of the motor stored in the second storage unit. Thus, it is possible to detect whether an authorized motor to which the identification information has been assigned in advance is attached to a robot or an unauthorized motor to which the identification information has not been assigned in advance is attached to the robot. As a result, it is possible to easily detect that the motor has been replaced unauthorizedly.

According to the present disclosure, as described above, it is possible to easily detect that the motor has been replaced unauthorizedly.

BRIEF DESCRIPTION OF THE DRAWINGS

FIG. 6 is a diagram illustrating a setting screen for performing switching of an unauthorized motor detection function to be enabled or disabled, according to the embodiment.

FIG. 7 is a diagram illustrating a setting screen for writing the identification information of the motor in the storage unit of the encoder according to the embodiment.

FIG. 8 is a diagram illustrating a setting screen for writing the identification information of the motor in the storage unit of the arm portion according to the embodiment.

FIG. 9 is a diagram illustrating a check screen for checking a setting of the unauthorized motor detection function according to the embodiment.

FIG. 10 is a flowchart for explaining control processing of the unauthorized motor detection function of the robot system according to the embodiment.

DETAILED DESCRIPTION OF THE INVENTION

Hereinafter, an embodiment for embodying the present disclosure will be described based on the drawings.

Configuration of Robot System

Figure 1:
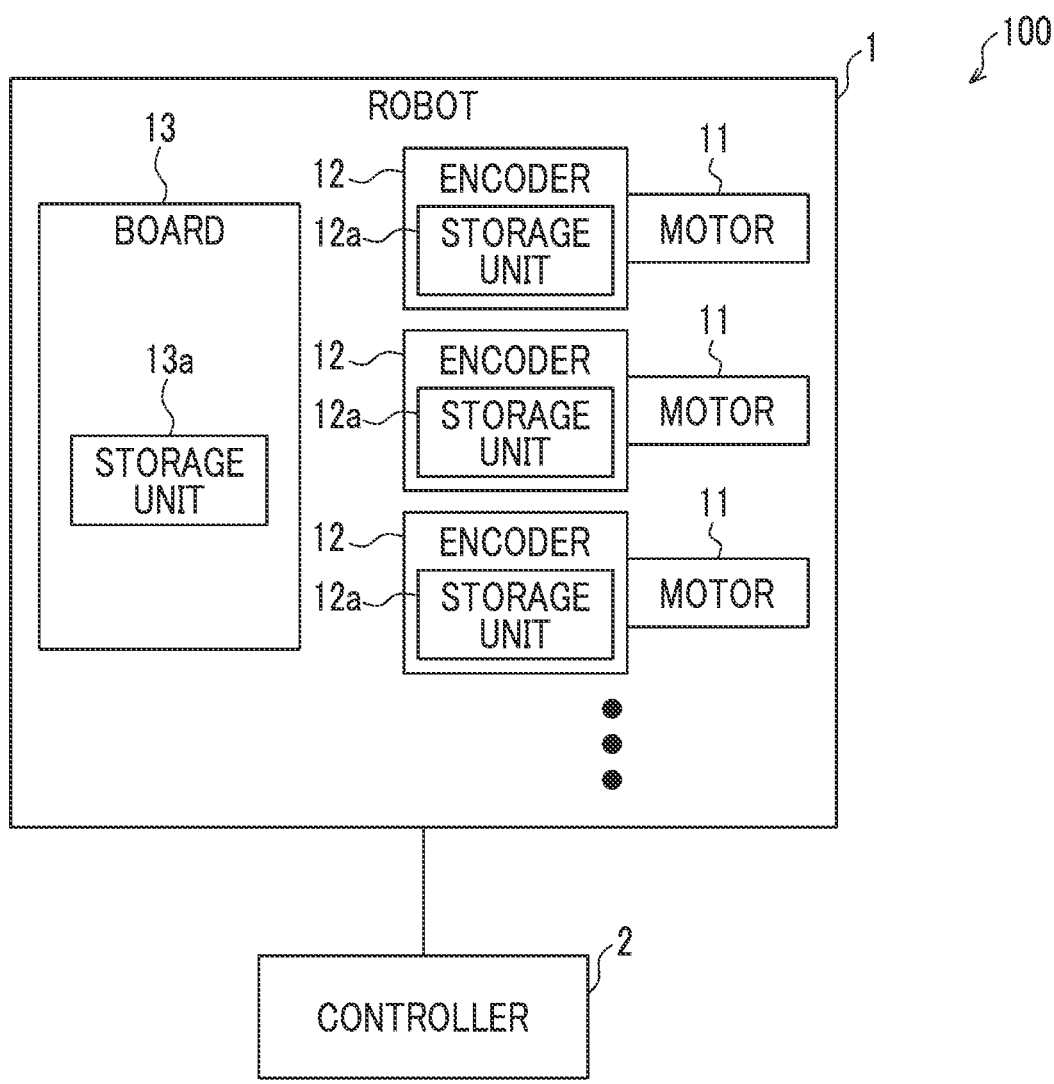
FIG. 1 is a block diagram illustrating a robot system according to an embodiment.

A configuration of a robot system 100 according to an embodiment will be described with reference to FIGS. 1 to 9. As illustrated in FIG. 1, the robot system 100 includes a robot 1 and a controller 2. The robot 1 is a clean robot disposed in a clean room. The robot 1 is a substrate transport robot that transports a substrate in the clean room. The robot 1 is a horizontal articulated robot having a plurality of joints, and includes a base portion, an arm portion connected to the base portion, and a hand portion connected to the arm portion. The hand portion holds a substrate. The substrate is, for example, a semiconductor wafer. The controller 2 is an example of a control unit.

The robot 1 also includes a motor 11, an encoder 12, and a board 13. A plurality of motors 11 are provided to correspond to the plurality of joints of the robot 1, respectively. Each of the plurality of motors 11 drives the corresponding joint. A plurality of encoders 12 are provided to correspond to the plurality of motors 11, respectively. Each of the plurality of encoders 12 is connected to the corresponding motor 11 and detects the rotational position of the corresponding motor 11. Each of the plurality of encoders 12 includes a storage unit 12a. The storage unit 12a is a non-volatile memory and stores information regarding the operation of the encoder 12 and the like. In the present embodiment, the storage unit 12a stores identification information of the motor 11. The storage unit 12a is an example of a first storage unit.

The board 13 is a circuit board provided at the arm portion of the robot 1. The board 13 includes a storage unit 13a. The storage unit 13a is a non-volatile memory, and stores information on the model of the robot 1 and the like. In the present embodiment, the storage unit 13a stores identification information of the motor 11. One storage unit 13a is provided at the arm portion of the robot 1. The storage unit 13a is provided separately from the storage unit 12a. The storage unit 12a and the storage unit 13a are provided in the robot 1. The storage unit 13a is an example of a second storage unit.

The controller 2 controls the operation of the robot 1. Specifically, the controller 2 controls the operation of the robot 1 by controlling the power supplied to the motor 11 of the robot 1. The controller 2 can be connected to a plurality of robots 1 and can control the operations of the plurality of robots 1. FIG. 1 illustrates only one robot 1 for convenience.

Figure 2:
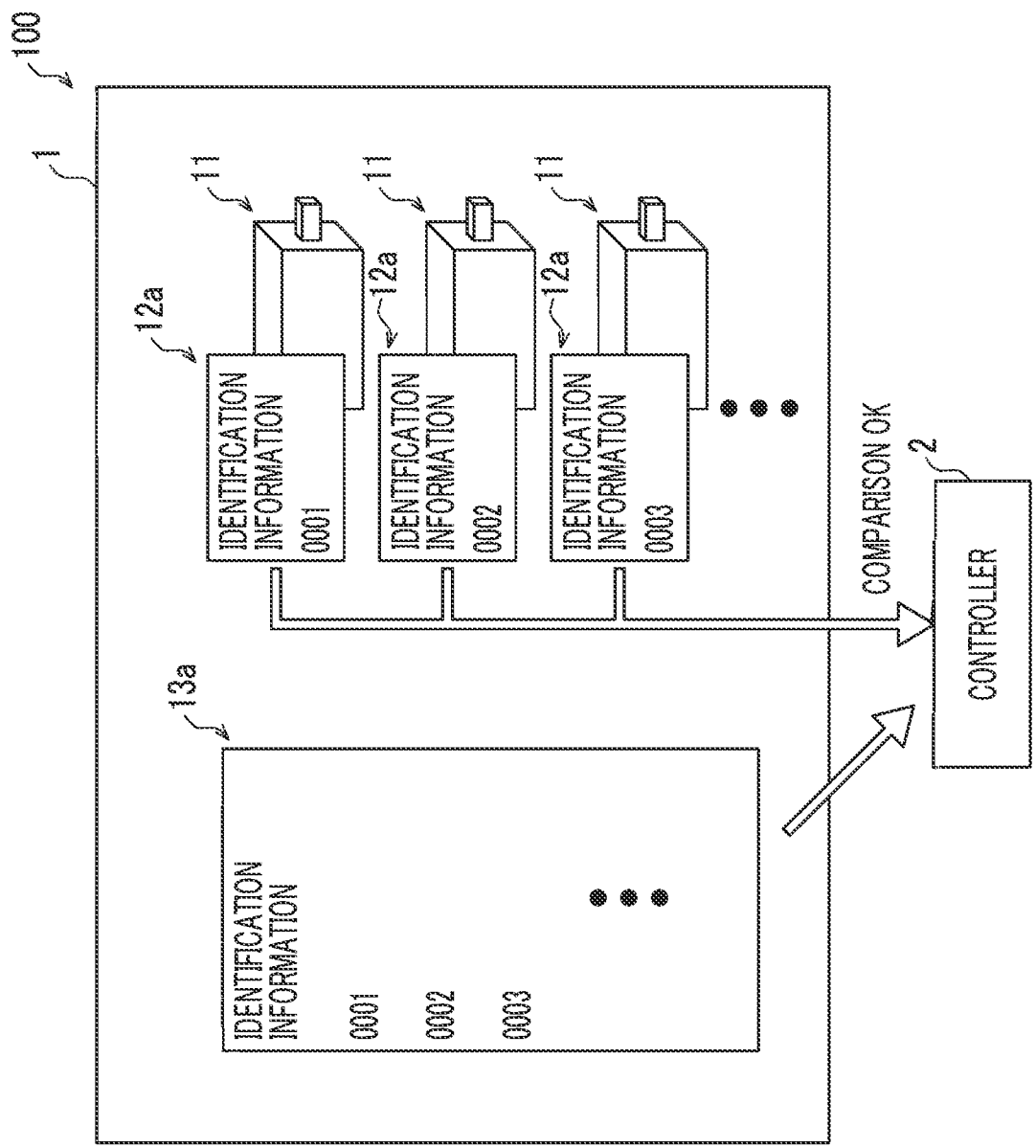
FIG. 2 is a diagram (1) for explaining comparison of identification information of a motor according to the embodiment.
Figure 3:
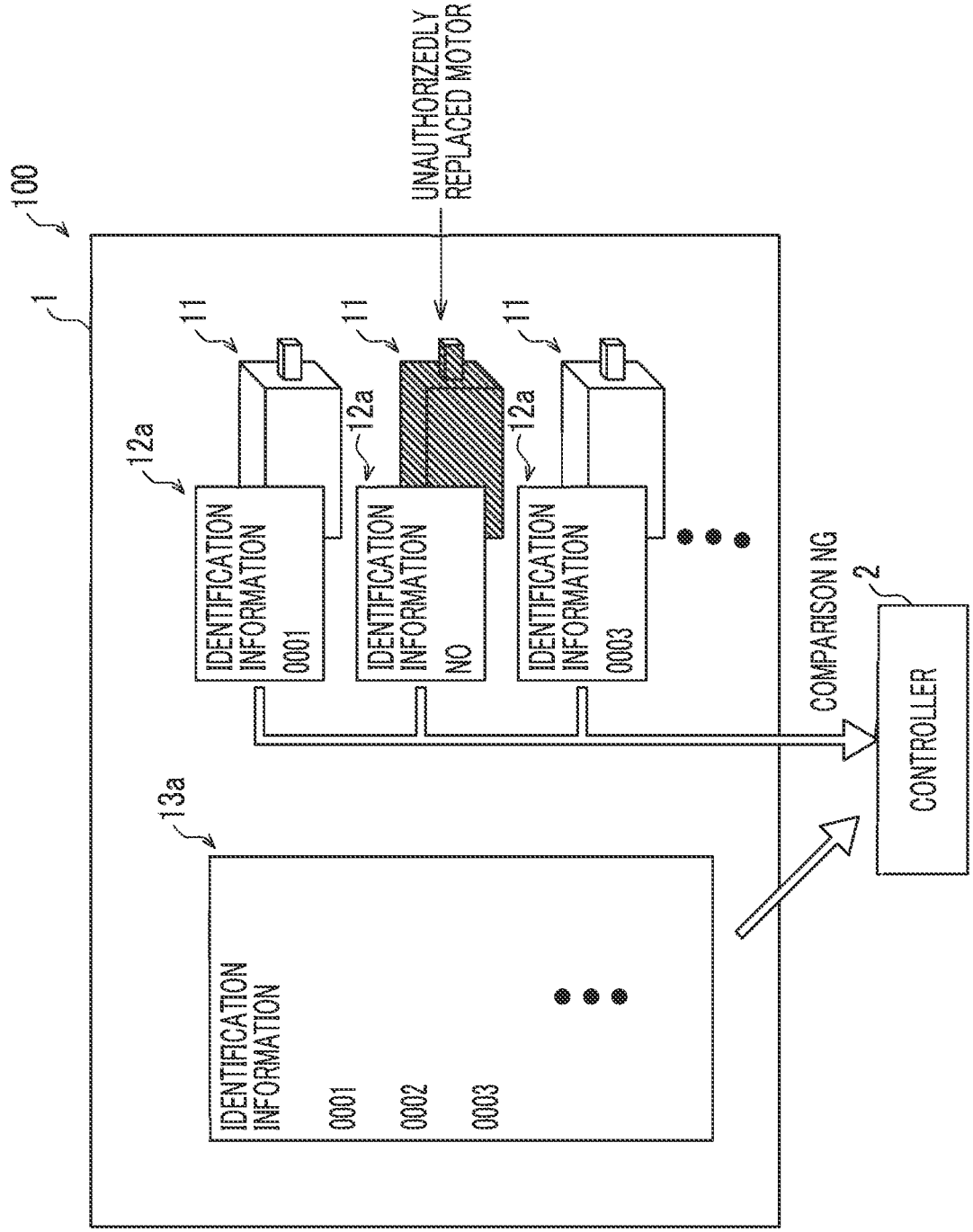
FIG. 3 is a diagram (2) for explaining the comparison of the identification information of the motor according to the embodiment.

Here, in the present embodiment, as illustrated in FIGS. 2 and 3, at the time of start, the controller 2 detects whether or not the motor 11 attached to the robot 1 is a motor 11 to which identification information has been assigned in advance, by comparing the identification information of the motor 11 stored in the storage unit 12a and the identification information of the motor 11 stored in the storage unit 13a. Specifically, when the identification information of the motor 11 stored in the storage unit 12a coincides with the identification information of the motor 11 stored in the storage unit 13a (see FIG. 2), the controller 2 detects that the motor 11 is the motor 11 to which the identification information has been assigned in advance. When the identification information of the motor 11 stored in the storage unit 12a does not coincide with the identification information of the motor 11 stored in the storage unit 13a (see FIG. 3), the controller 2 detects that the motor 11 is a motor 11 to which the identification information has not been assigned in advance.

As will be described later, identification information is assigned to an authorized motor 11 in advance, and identification information is not assigned to an unauthorized motor 11 in advance. Therefore, by detecting whether or not the motor 11 is the motor 11 to which the identification information has been assigned in advance, it is possible to detect whether the motor 11 is an authorized motor or an unauthorized motor. When the motor 11 is replaced, normally, the encoder 12 is replaced together with the motor 11. Therefore, by comparing the identification information of the motor 11 stored in the storage unit 12a of the encoder 12 and the identification information of the motor 11 stored in the storage unit 13a, it is possible to detect whether or not the motor 11 is the motor 11 to which the identification information has been assigned in advance.

In the present embodiment, the controller 2 sets a normal operation mode when detecting that the motor 11 is a motor 11 to which the identification information has been assigned in advance. Specifically, when the controller 2 detects that all of the plurality of motors 11 are motors 11 to which respective pieces of identification information have been assigned in advance, the controller 2 sets the normal operation mode. In the normal operation mode, the robot 1 operates normally and without restrictions when operated by the controller 2. Further, when the controller 2 detects that the motor 11 is not the motor 11 to which the identification information has been assigned in advance, the controller 2 sets a performance restriction mode in which the performance is restricted as compared with the performance in the normal operation mode. Specifically, when the controller 2 detects that at least one of the plurality of motors 11 is not the motor 11 to which the identification information has been assigned in advance, the controller 2 sets the performance restriction mode.

For example, when the controller 2 detects that the motor 11 is not the motor 11 to which the identification information has been assigned in advance, the controller 2 sets the performance restriction mode in which the speed is set to be lower than the speed in the normal operation mode. In the performance restriction mode, when the robot 1 is operated by the controller 2, the robot 1 is operated at an operation speed that is reduced by a predetermined ratio with respect to a normal speed. Further, for example, when the controller 2 detects that the motor 11 is not the motor 11 to which the identification information has been assigned in advance, the controller 2 sets the performance restriction mode in which the operations of some of the plurality of joints in the robot 1 are restricted. In the performance restriction mode, when the robot 1 is operated by the controller 2, predetermined joints among the plurality of joints are inoperable, and other joints are operable.

In comparison of the identification information of the motor 11, when the storage unit 13a is not attached to the robot 1 and it is not possible to read the identification information of the motor 11 from the storage unit 13a, the controller 2 sets the performance restriction mode. The case where the storage unit 13a is not attached to the robot 1 is, for example, the case where the board 13 is detached from the robot 1 for some reason. Further, the case where it is not possible to read the identification information of the motor 11 from the storage unit 13a is, for example, the case where the wiring for communicating with the board 13 has been changed for some reason. In the cases, the performance restriction mode is set because the motor 11 may have been replaced unauthorizedly.

In the present embodiment, the controller 2 performs a notification of an error when the controller 2 detects that the motor 11 is not the motor 11 to which the identification information has been assigned in advance. Specifically, the controller 2 notifies a host device that manages the robot system 100 of the error. When notified of an error, the host device displays the content of the error on a display unit. This enables a user to recognize an error caused by a situation in which the motor 11 attached to the robot 1 is not the motor 11 to which the identification information has been assigned in advance.

The setting of the identification information of the motor 11 will be described with reference to FIGS. 4 to 8. The setting is performed by connecting a setting device 200 to the controller 2. The setting device 200 is, for example, a personal computer, and includes an operation unit that inputs an operation of an operator and a display unit that displays a screen. The operator is a person who can authorizedly perform work on the robot system 100, such as an engineer of the manufacturer of the robot system 100 or a direct user who is not an end user who actually uses the robot system 100.

Figure 4:
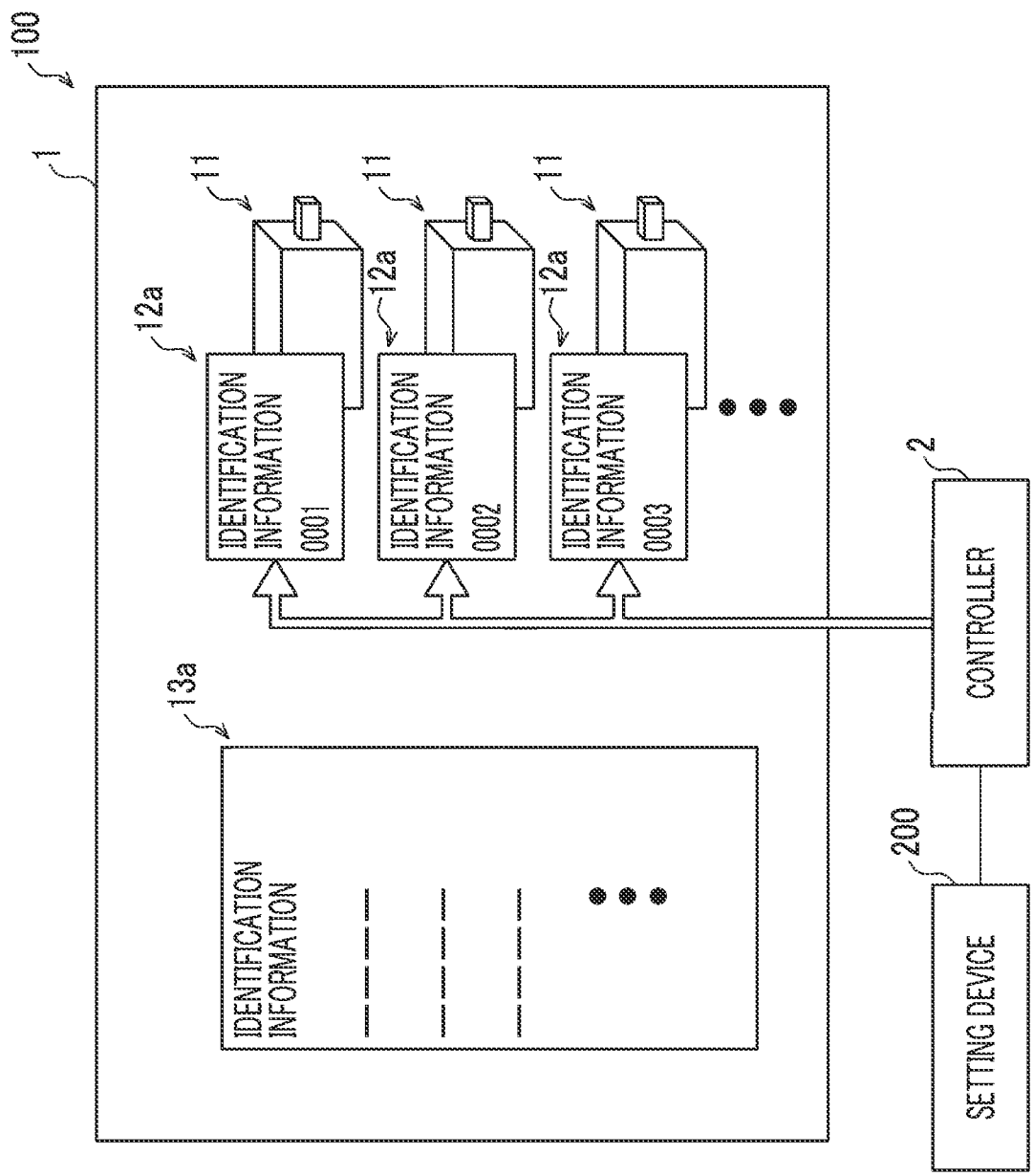
FIG. 4 is a diagram for explaining writing of the identification information of the motor in a storage unit of an encoder according to the embodiment.
Figure 5:
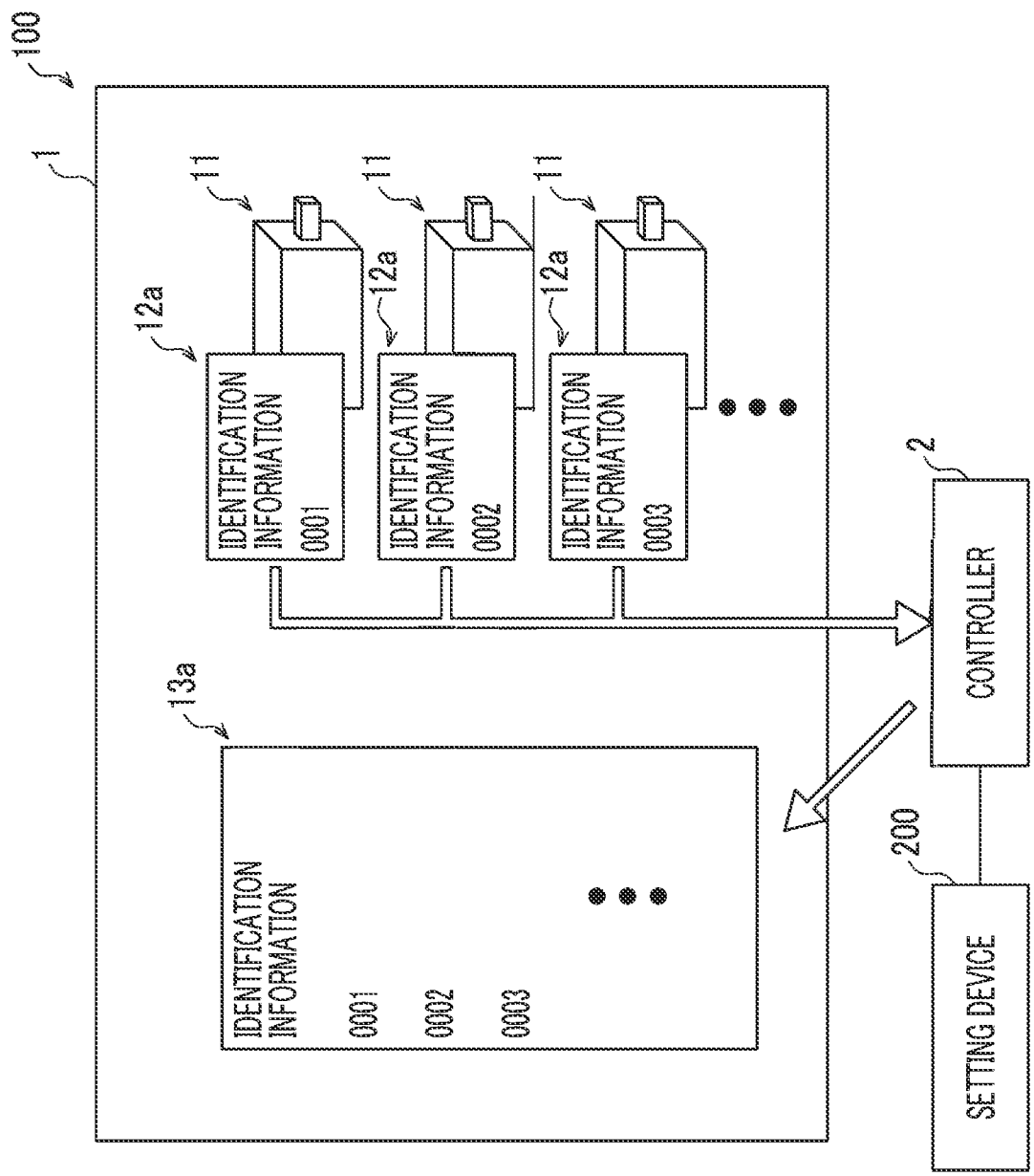
FIG. 5 is a diagram for explaining writing of the identification information of the motor in a storage unit of an arm portion according to the embodiment.

In the present embodiment, as illustrated in FIGS. 4 and 5, when setting the identification information of the motor 11, the controller 2 executes a process of receiving an input of the identification information of the motor 11 by the operator, a process of storing the received identification information of the motor 11 in the storage unit 12*a*, and a process of storing the identification information of the motor 11 stored in the storage unit 12*a*, in the storage unit 13*a*.

In the present embodiment, as illustrated in FIG. 6, the controller 2 performs switching of a function (for convenience, may be referred to as an "unauthorized motor detection function" below) of detecting whether or not the motor 11 is the motor 11 to which the identification information has been assigned in advance, to be enabled or disabled based on the operation of the operator. When the unauthorized motor detection function is switched to be enabled or disabled, the controller 2 receives an input of a password. The password is automatically set by the controller 2 in accordance with a predetermined rule. The operator ascertains the password automatically set by the controller 2, in accordance with a predetermined rule.

The operator displays a setting screen 201 on the display unit of the setting device 200, and operates the controller 2 by using the operation unit of the setting device 200, and thereby switching the unauthorized motor detection function to be enabled or disabled. Specifically, the operator inputs a program name to execute a program for switching the unauthorized motor detection function to be enabled or disabled. When the program is executed, the input of the password is required. Therefore, the operator inputs the ascertained password. When the correct password is input, an input of being enabled or disabled is required. Thus, the operator inputs the desired setting of being enabled or disabled. When being enabled is input, it is displayed that the unauthorized motor detection function is enabled. In addition, the controller 2 sets the unauthorized motor detection function to be enabled. Similarly, when being disabled is input, it is displayed that the unauthorized motor detection function is disabled. In addition, the controller 2 sets the unauthorized motor detection function to be disabled. FIG. 6 illustrates an example in which being enabled is input.

The identification information of the motor 11 is set in a state where the unauthorized motor detection function is switched to be enabled. Specifically, as illustrated in FIG. 7, the operator displays a setting screen 202 on the display unit of the setting device 200, and operates the controller 2 by using the operation unit of the setting device 200. In this manner, the identification information of the motor 11 is input and stored in the storage unit 12*a*. Specifically, the operator inputs the program name to execute the program for inputting the identification information of the motor 11 and storing the identification information in the storage unit 12*a*. When the program is executed, the input of the password is required. Therefore, the operator inputs the ascertained password. When the correct password is input, an input of the number of the robot 1 is required. The number of the robot 1 means the number set for each of a plurality of robots 1 when the plurality of robots 1 are connected to the controller 2. The operator inputs the number of the robot 1 for which the identification information of the motor 11 is desired to be set. Thus, it is possible to set the identification information of the motor 11 for each robot 1.

When the number of the robot 1 is input, the input of the identification information of the motor 11 of the robot 1 of which the number has been input is required. Therefore, the operator inputs the identification information of the motor 11. The identification information is configured by numbers, for example. In this case, the operator inputs any number as the identification information of the motor 11. When the identification information is input, as illustrated in FIG. 4, the controller 2 writes and stores the input identification information in the storage unit 12*a* corresponding to the motor 11 to which the identification information has been input. As a result, the identification information is assigned to the motor 11. As illustrated in FIG. 7, it is displayed that the writing of the identification information of the motor 11 in the storage unit 12*a* has been normally completed.

Further, as illustrated in FIG. 8, the operator displays a setting screen 203 on the display unit of the setting device 200, and operates the controller 2 by using the operation unit of the setting device 200, thereby storing the identification information of the motor 11 stored in the storage unit 12*a*, in the storage unit 13*a*. Specifically, the operator inputs the program name to execute a program for storing the identification information of the motor 11 stored in the storage unit 12*a*, in the storage unit 13*a*. When the program is executed, the input of the password is required. Therefore, the operator inputs the ascertained password. When the correct password is input, an input of the number of the robot 1 is required. The operator inputs the number of the robot 1 for which the identification information of the motor 11 is desired to be set.

When the number of the robot 1 is input, as illustrated in FIG. 5, the controller 2 reads the identification information of the motor 11 from the storage unit 12*a* of the robot 1 of which the number has been input. Then, the controller 2 writes and stores the read identification information of the motor 11 in the storage unit 13*a* of the robot 1 of which the number has been input. Thus, the same information as the identification information of the motor 11 stored in the storage unit 12*a* is stored in the storage unit 13*a*. As illustrated in FIG. 8, it is displayed that the writing of the identification information of the motor 11 in the storage unit 13*a* has been completed. The processing contents of each of the above programs are encrypted. As a result, it is not possible to easily interpret the processing contents of each program, including the setting of the password.

FIGS. 4 to 8 illustrate an example of setting the identification information of the motor 11 for the first time. When the identification information of the motors 11 is set for the first time, pieces of the identification information of all the plurality of motors 11 attached to the robot 1 are set. Further, when the motor 11 is authorizedly replaced, setting of identification information is performed on the replaced motor 11 as described with reference to FIGS. 7 and 8. That is, the controller 2 executes a process of receiving an input of the identification information of the replaced motor 11, a process of storing the received identification information of the motor 11 in the storage unit 12*a*, and a process of storing the identification information of the motor 11 stored in the storage unit 12*a*, in the storage unit 13*a*. Therefore, identification information is assigned in advance to the authorized motor 11. In addition, the identification information of the motor 11 stored in the storage unit 12*a* coincides with the identification information of the motor 11 stored in the storage unit 13*a*.

On the other hand, when the motor 11 is replaced unauthorizedly, the motor 11 is replaced by a person other than the person who can authorizedly replace the motor. Thus, the identification information is not set, as described with reference to FIGS. 7 and 8. Therefore, the identification information is not assigned in advance to the unauthorized motor 11. In this case, the identification information of the motor 11 stored in the storage unit 12a does not coincide with the identification information of the motor 11 stored in the storage unit 13a.

When the performance restriction mode is set due to unauthorized replacement of the motor 11, the unauthorized replacement of the motor 11 is replaced with an authorized motor, and the identification information of the motor 11 is set. Therefore, it is possible to cancel the performance restriction mode. By setting the identification information, the identification information of the motor 11 stored in the storage unit 12a coincides with the identification information of the motor 11 stored in the storage unit 13a. Thus, in comparison of the identification information, the normal operation mode is set and the performance restriction mode is canceled.

As illustrated in FIG. 9, the operator displays a check screen 204 on the display unit of the setting device 200 and operates the controller 2 by using the operation unit of the setting device 200, thereby checking the setting of the unauthorized motor detection function. Specifically, the operator inputs the program name to execute a program for checking the setting of the unauthorized motor detection function. When the program is executed, the input of the password is required. Therefore, the operator inputs the ascertained password. When the correct password is input, the controller 2 notifies the setting device 200 of a state of enabling the unauthorized motor detection function, the identification information of the motor 11 stored in the storage unit 12a for each robot 1, and the identification information of the motor 11 stored in the storage unit 13a for each robot 1. The setting device 200 displays the state of enabling the unauthorized motor detection function, the identification information of the motor 11 stored in the storage unit 12a for each robot 1, and the identification information of the motor 11 stored in the storage unit 13a for each robot 1, on the display unit. Thus, the operator can check the state of enabling the unauthorized motor detection function, the identification information of the motor 11 stored in the storage unit 12a for each robot 1, and the identification information of the motor 11 stored in the storage unit 13a for each robot 1.

Control processing of the unauthorized motor detection function by the robot system 100 of the present embodiment will be described based on a flowchart with reference to FIG. 10. Each process in the flowchart is executed by the controller 2.

When the controller 2 is started, as illustrated in FIG. 10, in Step S1, the identification information of the motor 11 is acquired from the storage units 12a and 13a. In Step S2, the identification information of the motor 11 stored in the storage unit 12a is compared with the identification information of the motor 11 stored in the storage unit 13a. In Step S3, it is determined whether or not the identification information of the motor 11 stored in the storage unit 12a coincides with the identification information of the motor 11 stored in the storage unit 13a. When the identification information of the motor 11 stored in the storage unit 12a coincides with the identification information of the motor 11 stored in the storage unit 13a, the process proceeds to Step S4, and the normal operation mode is set. The control processing is then ended.

When the identification information of the motor 11 stored in the storage unit 12a does not coincide with the identification information of the motor 11 stored in the storage unit 13a in Step S3, the process proceeds to Step S5, and the host device is notified of an error. The error is displayed on the display unit of the host device. In Step S6, the performance restriction mode is set. The control processing is then ended.

Effect of Present Embodiment

In the present embodiment, as described above, the robot system 100 includes the robot 1 including the motor 11, the storage unit 12a that is provided to correspond to the motor 11 and stores the identification information of the motor 11, the storage unit 13a that is provided separately from the storage unit 12a, and stores the identification information of the motor 11, and the controller 2 that detects whether or not the motor 11 attached to the robot 1 is a motor 11 to which the identification information has been assigned in advance, by comparing the identification information of the motor 11 stored in the storage unit 12a and the identification information of the motor 11 stored in the storage unit 13a.

Thus, it is possible to detect whether an authorized motor 11 to which identification information has been assigned in advance is attached to a robot 1 or an unauthorized motor 11 to which the identification information has not been assigned in advance is attached to the robot 1. As a result, it is possible to easily detect that the motor 11 has been replaced unauthorizedly.

Further, in the present embodiment, as described above, when the controller 2 detects that the motor 11 is the motor 11 to which the identification information has been assigned in advance, the controller 2 sets the normal operation mode. In addition, when the controller 2 detects that the motor 11 is not the motor 11 to which the identification information has been assigned in advance, the controller 2 sets the performance restriction mode in which the performance is restricted as compared to the performance in the normal operation mode. Thus, when an authorized motor 11 to which identification information has been assigned in advance is attached to the robot 1, the normal operation mode can be set, so that it is possible to appropriately operate the robot 1 as usual. On the other hand, when an unauthorized motor 11 to which identification information has not been assigned in advance is attached to the robot 1, the performance restriction mode can be set. Thus, it is possible to suppress an occurrence of a problem in the robot 1 to which the unauthorized motor 11 having deteriorated performance as compared with an authorized motor is attached. Further, when the performance restriction mode is set, it is possible to operate the robot 1 even though the performance is restricted. Thus, it is possible to wait for replacement of an authorized motor 11 while continuously operating the robot 1. As a result, compared to the case where the robot 1 does not operate, it is possible to reduce an influence on the production efficiency and the like caused by the delay in the work of the robot 1 until the authorized motor 11 is replaced.

Further, in the present embodiment, as described above, when the controller 2 detects that the motor 11 is not the motor 11 to which the identification information has been assigned in advance, the controller 2 sets the performance restriction mode in which the speed is set to be lower than the speed in the normal operation mode. Thus, it is possible to wait for replacement of the authorized motor 11 while operating the robot 1 at a low speed. Accordingly, it is possible to easily reduce the influence on the production efficiency and the like caused by the delay in the work of the robot 1 until the authorized motor 11 is replaced.

Further, in the present embodiment, as described above, the robot 1 is an articulated robot. When the controller 2 detects that the motor 11 is not the motor 11 to which the identification information has been assigned in advance, the controller 2 sets the performance restriction mode in which the operations of some of the plurality of joints in the robot 1 are restricted. As a result, it is possible to wait for the replacement of the authorized motor 11 while operating the joints of which the operation is not restricted among the plurality of joints of the robot 1. Thus, it is possible to easily reduce the influence on the production efficiency and the like caused by the delay in the work of the robot 1 until the authorized motor 11 is replaced.

In the present embodiment, as described above, the controller 2 performs a notification of an error when the controller 2 detects that the motor 11 is not the motor 11 to which the identification information has been assigned in advance. Thus, when an unauthorized motor 11 to which identification information has not been assigned in advance is attached to the robot 1, it is possible to easily recognize that the unauthorized motor 11 is attached to the robot 1, by the error notification.

Further, in the present embodiment, as described above, the controller 2 performs switching of the function of detecting whether or not the motor 11 is the motor 11 to which the identification information has been assigned in advance, to be enabled or disabled based on the operation of the operator. As a result, by the determination of the operator, it is possible to perform switching of the function of detecting whether or not the motor 11 is the motor 11 to which the identification information has been assigned in advance, to be enabled or disabled. Thus, it is possible to flexibly handle even a case where it is desired to temporarily disable the function of detecting whether or not the motor 11 is the motor 11 to which the identification information has been assigned in advance.

Further, in the present embodiment, as described above, the controller 2 receives the input of a password when the controller 2 performs switching of the function of detecting whether or not the motor 11 is the motor 11 to which the identification information has been assigned in advance, to be enabled or disabled. Thus, it is possible to disable switching of the function of detecting whether or not the motor 11 is the motor 11 to which the identification information has been assigned in advance, to be enabled or disabled unless the password is input. Thus, it is possible to suppress an occurrence of incorrect switching of the function.

Further, in the present embodiment, as described above, when setting the identification information of the motor 11, the controller 2 executes a process of receiving an input of the identification information of the motor 11 by the operator, a process of storing the received identification information of the motor 11 in the storage unit 12a, and a process of storing the identification information of the motor 11 stored in the storage unit 12a, in the storage unit 13a. Thus, it is possible to assign the identification information by the input of the operator and to store the identification information assigned to the motor 11, in the storage unit 12a and the storage unit 13a. Thus, it is possible to easily realize a configuration of detecting whether or not the motor 11 is the motor 11 to which the identification information has been assigned in advance.

In addition, in the present embodiment, as described above, the storage unit 12a is a storage unit of the encoder provided to correspond to the motor 11. Thus, it is possible to store the identification information of the motor 11 by effectively using the storage unit of the encoder, so there is no need to provide the storage unit 12a independently of the storage unit of the encoder. As a result, it is possible to suppress an increase in the number of components as compared to the case where the storage unit 12a is provided independently of the storage unit of the encoder.

Further, in the present embodiment, the storage unit 12a and the storage unit 13a are provided in the robot 1 as described above. Thus, even when the robot 1 itself is replaced, since the robot 1 is provided with both the storage unit 12a and the storage unit 13a, it is possible to easily acquire the identification information of the motor 11 stored in the storage unit 12a and the identification information of the motor 11 stored in the storage unit 13a, from the robot 1. As a result, even when the robot 1 itself is replaced, it is possible to easily realize a configuration of detecting whether or not the motor 11 is a motor 11 to which the identification information has been assigned in advance.

Further, in the present embodiment, as described above, the robot 1 is a clean robot disposed in a clean room. As a result, even when the motor 11 is replaced unauthorizedly due to a failure of the motor 11 in the clean robot or the like, it is possible to easily detect that the motor 11 has been unauthorizedly replaced. Also, when the robot 1 is a clean robot that is greatly affected by stopping the operation, if the performance restriction mode is set, it is possible to wait for replacement of an authorized motor 11 while continuously operating the robot 1. Thus, it is possible to effectively reduce the influence on the production efficiency and the like caused by the delay in the work of the robot 1 until the authorized motor 11 is replaced.

MODIFICATION EXAMPLES

It should be noted that the embodiment disclosed this time is exemplary in all respects and is not considered to be restrictive. The scope of the present disclosure is shown by the scope of claims rather than the description of the embodiment described above, and further includes all changes (modification examples) within the meaning and scope equivalent to the scope of claims.

For example, in the above embodiment, an example in which the robot is a clean robot disposed in a clean room has been described, but the present disclosure is not limited to this. In the present disclosure, the robot may be a robot disposed outside the clean room.

Further, in the above embodiment, an example in which the robot is a substrate transport robot that transports substrates has been described, but the present disclosure is not limited to this. In the present disclosure, the robot may be an industrial robot other than the substrate transport robot.

Further, in the above embodiment, an example in which the robot is a horizontal articulated robot has been described, but the present disclosure is not limited to this. In the present disclosure, the robot may be a robot such as a vertical articulated robot other than a horizontal articulated robot.

Further, in the above embodiment, an example in which the first storage unit is the storage unit of the encoder has been described, but the present disclosure is not limited to this. In the present disclosure, the first storage unit may be a storage unit other than the storage unit included in the encoder as long as the storage unit is provided to correspond to the motor. For example, the first storage unit may be a storage unit provided in a driver that drives and controls a motor, or may be a storage unit provided in a mechanical component such as a speed reducer connected to the motor.

Further, in the above embodiment, an example in which the board including the second storage unit is provided at the arm portion of the robot has been described, but the present disclosure is not limited to this. In the present disclosure, the board including the second storage unit may be provided at the base portion of the robot.

Further, in the above embodiment, an example in which, when it is detected that the motor is not a motor to which identification information has been assigned in advance, the performance restriction mode is set has been described, but the present disclosure is not limited to this. In the present disclosure, when it is detected that the motor is not a motor to which the identification information has been assigned in advance, the robot may be caused not to operate. As a result, when an unauthorized motor to which identification information is not assigned in advance is attached to the robot, it is possible to cause the robot not to operate. Thus, it is possible to suppress an occurrence of an inappropriate operation in the robot to which the unauthorized motor is attached.

Further, in the above embodiment, an example in which, when it is detected that the motor is not a motor to which identification information has been assigned in advance, the performance restriction mode in which the speed is set to be lower than the speed in the normal operation mode, or operations of some of the plurality of joints in the robot are restricted is set has been described. However, the present disclosure is not limited to this. In the present disclosure, when it is detected that the motor is not a motor to which identification information has been assigned in advance, a performance restriction mode other than the performance restriction mode in which the speed is set to be lower than the speed in the normal operation mode and the performance restriction mode in which the operations of some of the plurality of joints in the robot are restricted may be set.

Further, in the above embodiment, an example in which the identification information of the motor is stored in the first storage unit, and then the identification information of the motor stored in the first storage unit is stored in the second storage unit, but the present disclosure is not limited to this. In the present disclosure, the identification information of the motor may be simultaneously stored in parallel in the first storage unit and the second storage unit.

Although an example in which the second storage unit is provided in the robot has been described in the above embodiment, the present disclosure is not limited to this. In the present disclosure, the second storage unit may be provided in the controller.

The functionality of the elements disclosed herein can be implemented by using circuits or processing circuits including general purpose processors, special purpose processors, integrated circuits, application specific integrated circuits (ASICs), conventional circuits, and/or combinations thereof configured or programmed to perform the disclosed functions. A processor is considered a processing circuit or circuit because the processor includes transistors and other circuits. In the present disclosure, a circuit, a unit, or means is hardware that performs the described functions or is programmed to perform the described functions. The hardware may be the hardware disclosed herein, or other known hardware programmed or configured to perform the described functions. When the hardware is a processor considered as one type of circuit, a circuit, means, or a unit is a combination of hardware and software, and the software is used for the configuration of the hardware and/or the processor.

ASPECTS

It will be understood by those skilled in the art that the above exemplary embodiments are specific examples of the following aspects.

Item 1

A robot system including: a robot including a motor; a first storage unit that is provided to correspond to the motor and stores identification information of the motor; a second storage unit that is provided separately from the first storage unit and stores the identification information of the motor; and a control unit that detects whether or not the motor attached to the robot is a motor to which the identification information has been assigned in advance, by comparing the identification information of the motor stored in the first storage unit and the identification information of the motor stored in the second storage unit.

Item 2

The robot system described in Item 1, in which the control unit sets a normal operation mode when the control unit detects that the motor is the motor to which the identification information has been assigned in advance, and causes the robot not to operate or sets a performance restriction mode in which performance is restricted as compared with performance in the normal operation mode, when the control unit detects that the motor is not the motor to which the identification information has been assigned in advance.

Item 3

The robot system described in Item 2, in which the control unit sets the performance restriction mode in which a speed is set to be lower than a speed in the normal operation mode, when the control unit detects that the motor is not the motor to which the identification information has been assigned in advance.

Item 4

The robot system described in Item 2, in which the robot is an articulated robot, and the control unit sets the performance restriction mode in which operations of some of a plurality of joints of the robot are restricted, when the control unit detects that the motor is not the motor to which the identification information has been assigned in advance.

Item 5

The robot system described in any one of Items 1 to 4, in which the control unit performs a notification of an error when the control unit detects that the motor is not the motor to which the identification information has been assigned in advance.

Item 6

The robot system described in any one of Items 1 to 5, in which the control unit performs switching of a function of detecting whether or not the motor is the motor to which the identification information has been assigned in advance, to be enabled or disabled, based on an operation of an operator.

Item 7

The robot system described in Item 6, in which the control unit receives an input of a password when the function of detecting whether or not the motor is the motor to which the identification information has been assigned in advance is switched to be enabled or disabled.

Item 8

The robot system described in any one of Items 1 to 7, in which when setting the identification information of the motor, the control unit executes a process of receiving an input of the identification information of the motor by an operator, a process of storing the received identification information of the motor in the first storage unit, and a process of storing the identification information of the motor, which has been stored in the first storage unit, in the second storage unit.

Item 9

The robot system described in any one of Items 1 to 8, in which the first storage unit is provided in an encoder provided to correspond to the motor.

Item 10

The robot system described in any one of Items 1 to 9, in which the first storage unit and the second storage unit are provided in the robot.

Item 11

The robot system described in any one of Items 1 to 10, in which the robot is a clean robot disposed in a clean room.

What is claimed is:

1. A robot system comprising:
   a robot that includes a motor;
   a first storage unit comprising a memory that is provided to correspond to the motor and stores identification information of the motor;
   a second storage unit comprising a memory that is provided separately from the first storage unit and stores the identification information of the motor; and
   a control unit comprising a hardware controller that detects whether or not the motor attached to the robot is a motor to which the identification information has been assigned in advance, by comparing the identification information of the motor stored in the first storage unit and the identification information of the motor stored in the second storage unit, and sets a performance restriction mode in which performance is restricted as compared with performance in a normal operation mode, in response to detecting that the motor is not the motor to which the identification information has been assigned in advance, the performance restriction mode not including stopping the operation of the robot.

2. The robot system according to claim 1,
   wherein the control unit
   sets the normal operation mode when the control unit detects that the motor is the motor to which the identification information has been assigned in advance.

3. The robot system according to claim 1,
   wherein the control unit sets the performance restriction mode in which a speed is set to be lower than a speed in the normal operation mode, in response to detecting that the motor is not the motor to which the identification information has been assigned in advance.

4. The robot system according to claim 1,
   wherein the robot is an articulated robot, and
   the control unit sets the performance restriction mode in which operations of some of a plurality of joints of the robot are restricted, in response to detecting that the motor is not the motor to which the identification information has been assigned in advance.

5. The robot system according to claim 1,
   wherein the control unit performs a notification of an error in response to detecting that the motor is not the motor to which the identification information has been assigned in advance.

6. The robot system according to claim 1,
   wherein the control unit performs switching of a function of detecting whether or not the motor is the motor to which the identification information has been assigned in advance, to be enabled or disabled, based on an operation input.

7. The robot system according to claim 6,
   wherein the control unit receives an input of a password when the function of detecting whether or not the motor is the motor to which the identification information has been assigned in advance is switched to be enabled or disabled.

8. The robot system according to claim 1,
   wherein the control unit sets the identification information of the motor, by executing
   a process of receiving an input of the identification information of the motor,
   a process of storing the received identification information of the motor in the first storage unit, and
   a process of storing the identification information of the motor, which has been stored in the first storage unit, in the second storage unit.

9. The robot system according to claim 1,
   wherein the first storage unit is provided in an encoder provided to correspond to the motor.

10. The robot system according to claim 1,
    wherein the first storage unit and the second storage unit are provided at the robot.

11. The robot system according to claim 1,
    wherein the robot is a clean robot disposed in a clean room.

12. A method of controlling a robot that includes a motor, a first storage unit corresponding to the motor and storing identification information of the motor, and a second storage unit provided separately from the first storage unit and storing the identification information of the motor, the method comprising:
    detecting whether the motor attached to the robot is a motor to which the identification information has been assigned in advance, by comparing the identification information of the motor stored in the first storage unit and the identification information of the motor stored in the second storage unit, and
    setting a performance restriction mode in which performance is restricted as compared with performance in a normal operation mode, in response to detecting that the motor is not a motor to which the identification information has been assigned in advance, wherein
    the performance restriction mode does not include stopping the operation of the robot.

13. The method according to claim 12, further comprising:
    setting the normal operation mode in response to detecting that the motor is the motor to which the identification information has been assigned in advance.

14. The method according to claim 12, wherein:
    setting the performance restriction mode in response to detecting that the motor is not the motor to which the identification information has been assigned in advance comprises setting a speed to be lower than a speed in the normal operation mode.

15. The method according to claim 12, wherein
    the robot is an articulated robot comprising a plurality of joints, and
    setting the performance restriction mode comprises restricting the operations of some of the plurality of joints, in response to detecting that the motor is not the motor to which the identification information has been assigned in advance.

16. The method according to claim 12, further comprising performing a notification of an error in response to detecting that the motor is not the motor to which the identification information has been assigned in advance.

17. The method according to claim 12, further comprising performing switching of a function of detecting whether the motor is the motor to which the identification information has been assigned in advance, between being enabled and being disabled, based on an operation input.

18. The method according to claim 17, wherein the switching of a function of detecting whether the motor is the motor to which the identification information has been assigned in advance, between being enabled and being disabled, based on an operation input is performed in response to receiving an input of a password.

19. The method according to claim 12, further comprises setting the identification information of the motor by:
  receiving an input of the identification information of the motor,
  storing the received identification information of the motor in the first storage unit, and
  storing the identification information of the motor, which has been stored in the first storage unit, in the second storage unit.

20. The method according to claim 12,
wherein the robot is a clean robot disposed in a clean room.

* * * * *